United States Patent
Tsuji

(10) Patent No.: US 9,507,584 B2
(45) Date of Patent: Nov. 29, 2016

(54) ELECTRONIC DEVICE INCLUDING A MEMORY TECHNOLOGY DEVICE

(71) Applicant: KYOCERA Document Solutions Inc., Osaka (JP)

(72) Inventor: Shuntaro Tsuji, Osaka (JP)

(73) Assignee: KYOCERA Document Solutions Inc. (JP)

( * ) Notice: Subject to any disclaimer, the term of this patent is extended or adjusted under 35 U.S.C. 154(b) by 85 days.

(21) Appl. No.: 14/554,148

(22) Filed: Nov. 26, 2014

(65) Prior Publication Data

US 2015/0149759 A1 May 28, 2015

(30) Foreign Application Priority Data

Nov. 28, 2013 (JP) ................................. 2013-246825

(51) Int. Cl.
*G06F 9/445* (2006.01)
*G06F 9/44* (2006.01)

(52) U.S. Cl.
CPC .............. *G06F 8/665* (2013.01); *G06F 9/441* (2013.01)

(58) Field of Classification Search
CPC ................................ G06F 8/665; G06F 9/441
See application file for complete search history.

(56) References Cited

U.S. PATENT DOCUMENTS

| 7,725,700 | B2* | 5/2010 | Wang | G06F 9/4401 713/1 |
|---|---|---|---|---|
| 2003/0063316 | A1 | 4/2003 | Irino | |
| 2005/0138347 | A1* | 6/2005 | Haverkamp | G06F 8/65 713/2 |
| 2009/0150598 | A1* | 6/2009 | Jung | G06F 11/1666 711/103 |
| 2011/0197019 | A1* | 8/2011 | Fukui | G06F 12/0866 711/104 |
| 2011/0271270 | A1* | 11/2011 | Bowen | G06F 8/67 717/171 |
| 2013/0163040 | A1* | 6/2013 | Tsuji | G06F 3/0626 358/1.15 |
| 2015/0149759 | A1* | 5/2015 | Tsuji | G06F 9/441 713/2 |

FOREIGN PATENT DOCUMENTS

JP    2003-200620 A    7/2003

OTHER PUBLICATIONS

Emery, Van. Linux Ramdisk mini-HOWTO. Published Jun. 14, 2012 [retrieved on Apr. 16, 2016]. Retrieved from the Internet <URL: http://www.vanemery.com/Linux/Ramdisk/ramdisk.html>.*

* cited by examiner

*Primary Examiner* — Nitin Patel
*Assistant Examiner* — Kevin Stewart
(74) *Attorney, Agent, or Firm* — McDonnell Boehnen Hulbert & Berghoff LLP

(57) ABSTRACT

The electronic device may include a RAM, a nonvolatile storage device as an MTD, and firmware that may be stored on the nonvolatile storage device. The firmware may include a kernel that is expanded onto the RAM and a root disk image as a root file system. The kernel mounts the root disk image on the nonvolatile storage device as the root file system when a boot mode of the electronic device is a normal boot mode. The kernel, when the boot mode is an update mode for updating the firmware on the nonvolatile storage device, may i) generate a RAM disk as an MTD in an area of the RAM not under management of the kernel, ii) expand the root disk image on the nonvolatile storage device into the RAM disk, and iii) mount the root disk image on the RAM disk as the root file system.

4 Claims, 13 Drawing Sheets

ELECTRONIC DEVICE INCLUDING A MEMORY TECHNOLOGY DEVICE

INCORPORATION BY REFERENCE

This application is based on, and claims priority to corresponding Japanese Patent Application No. 2013-246825, filed in the Japan Patent Office on Nov. 28, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an electronic device including a nonvolatile storage device serving as a memory technology device (MTD).

BACKGROUND

A typical electronic device that includes a nonvolatile storage device serving as the MTD may be, for example, an image forming apparatus including a random access memory (RAM) and a flash memory serving as the nonvolatile storage device.

FIG. 10 is a schematic diagram illustrating an example of a configuration of a RAM 81 and a flash memory 82 within such a typical electronic device 80 as described above.

As illustrated in FIG. 10, the electronic device 80 includes the RAM 81 and the flash memory 82 serving as a nonvolatile storage device.

The flash memory 82 stores firmware 82a for a Linux® system.

The firmware 82a includes a boot loader 82b that is executed when the electronic device 80 is booted, a kernel 82c to be expanded onto the RAM 81, a root disk image 82d for normal boot that is a root disk image serving as a compressed file of a root file system and that is used when a boot mode of the electronic device 80 is a normal boot mode, and a root disk image 82e for update that is a root disk image used when the boot mode of the electronic device 80 is an update mode for updating the firmware 82a on the flash memory 82.

The root disk image 82d for normal boot is a file having a format that can be read by a kernel 81c described later from the MTD via a read-only file system such as Cramfs or Squashfs. On the other hand, the root disk image 82e for update is a file having a format that can be read by the kernel 81c from an area of the RAM 81 under management of the kernel 81c. The format that can be read by the kernel 81c from the MTD is different from the format that can be read by the kernel 81c from the area of the RAM 81 under the management of the kernel 81c in terms of a mechanism of Linux®. In other words, the root disk image 82d for normal boot and the root disk image 82e for update are files having formats different from each other.

FIG. 11 is a flowchart of an operation performed when the electronic device 80 is booted. FIG. 12 is a schematic diagram illustrating a configuration of the RAM 81 and the flash memory 82 employed when the boot mode of the electronic device 80 is the normal boot mode. FIG. 13 is a schematic diagram illustrating a configuration of the RAM 81 and the flash memory 82 employed when the boot mode of the electronic device 80 is the update mode.

As illustrated in FIG. 11, when booted, the electronic device 80 expands the boot loader 82b on the flash memory 82 onto the RAM 81 as a boot loader 81b (refer to FIG. 12 and FIG. 13) (S91).

Subsequently, the boot loader 81b expands the kernel 82c on the flash memory 82 onto the RAM 81 as the kernel 81c (refer to FIG. 12 and FIG. 13) (S92).

Subsequently, the boot loader 81b determines whether or not the boot mode of the electronic device 80 is the update mode (S93).

When determining in Step S93 that the boot mode is not the update mode—that is, when the boot mode is the normal boot mode—the boot loader 81b notifies the kernel 81c that the boot mode is the normal boot mode (S94).

When notified by the boot loader 81b that the boot mode is the normal boot mode, the kernel 81c mounts the root disk image 82d for normal boot on the flash memory 82 as the root file system (S95). Accordingly, as illustrated in FIG. 12, the root disk image 82d for normal boot is read into an area of the RAM 81 not under the management of the kernel 81c in unit of a page as the need arises.

When determining in Step S93 that the boot mode is the update mode, the boot loader 81b notifies the kernel 81c that the boot mode is the update mode (S96).

When notified by the boot loader 81b that the boot mode is the update mode, as illustrated in FIG. 13, the kernel 81c expands the root disk image 82e for update on the flash memory 82 into the area of the RAM 81 under the management of the kernel 81c as a root disk image 81e for update (S97), and then mounts the root disk image 81e for update on the RAM 81 as the root file system (S98). Accordingly, as illustrated in FIG. 13, the root disk image 81e for update is read into the area of the RAM 81 not under the management of the kernel 81c in unit of the page as the need arises. Note that, the electronic device 80 operates in accordance with the root disk image 81e for update on the RAM 81, and hence can delete the firmware 82a before update from the flash memory 82 and then write the firmware 82a after update into the flash memory 82.

When the process of Step S95 or Step S98 is finished, the electronic device 80 finishes the operation illustrated in FIG. 11.

However, on the electronic device 80, two kinds of root disk images, the root disk image 82d for normal boot and the root disk image 82e for update, need to be stored in the flash memory 82, which increases a capacity necessary for the flash memory 82.

SUMMARY

The present disclosure relates to an electronic device capable of suppressing a capacity necessary for a nonvolatile storage device.

The electronic device according to the present disclosure includes a random access memory (RAM), a nonvolatile storage device configured to act as a memory technology device (MTD), and firmware that is stored on the nonvolatile storage device. The firmware includes a kernel that may be expanded onto the RAM and a root disk image as a root file system.

The kernel mounts the root disk image on the nonvolatile storage device as the root file system when a boot mode of the electronic device is a normal boot mode.

The kernel, when the boot mode is an update mode for updating the firmware on the nonvolatile storage device, may i) generate a RAM disk as an MTD in an area of the RAM not under management of the kernel, ii) expand the root disk image on the nonvolatile storage device into the RAM disk, and iii) mount the root disk image on the RAM disk as the root file system.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Now, an embodiment of the present disclosure is described with reference to the accompanying drawings.

First, a description is made of a configuration of an MFP serving as an electronic device according to this embodiment.

Figure 1:
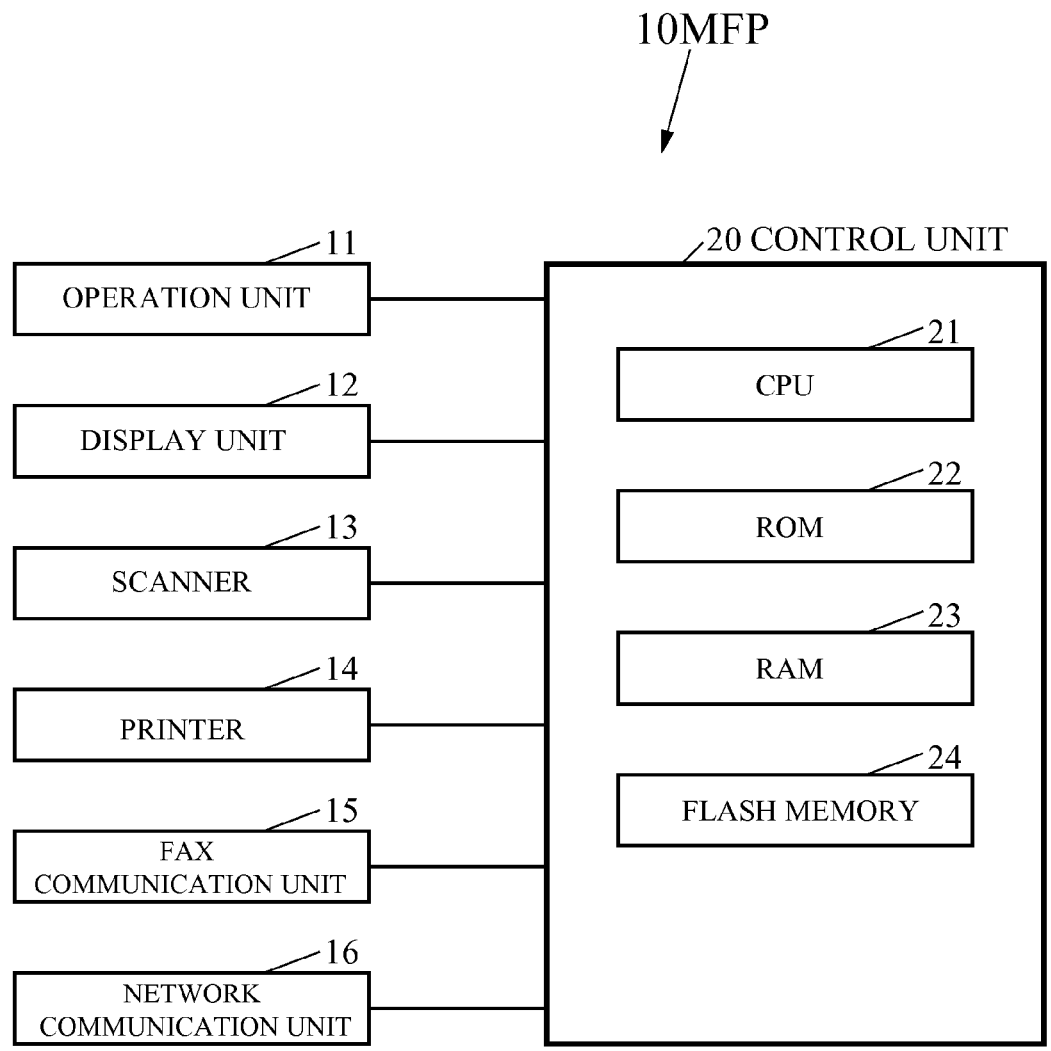
FIG. 1 is a schematic diagram illustrating a block configuration of a multifunction peripheral (MFP) according to an embodiment of the present disclosure.

FIG. 1 is a schematic diagram illustrating a block configuration of an MFP 10 according to this embodiment.

As illustrated in FIG. 1, the MFP 10 includes an operation unit 11 serving as an input device such as buttons through which a user inputs various operations, a display unit 12 serving as a display device such as a liquid crystal display (LCD) that displays various kinds of information, a scanner 13 serving as a reading device that reads an image from an original, a printer 14 serving as a printing device that executes printing on a recording medium such as paper, a FAX communication unit 15 serving as a FAX device that performs FAX communications to/from an external facsimile machine (not shown) via a communication line such as a public telephone line, a network communication unit 16 serving as a network communication device that performs communications to/from an external device (not shown) via a network such as a local area network (LAN) or the Internet, and a control unit 20 that controls the entire MFP 10.

The control unit 20 includes a central processing unit (CPU) 21, a read only memory (ROM) 22 that stores a program for the CPU 21 and different kinds of data, a random access memory (RAM) 23 used as a work area for the CPU 21, and a flash memory 24 of a NAND type or a NOR type serving as an MTD.

Figure 2:
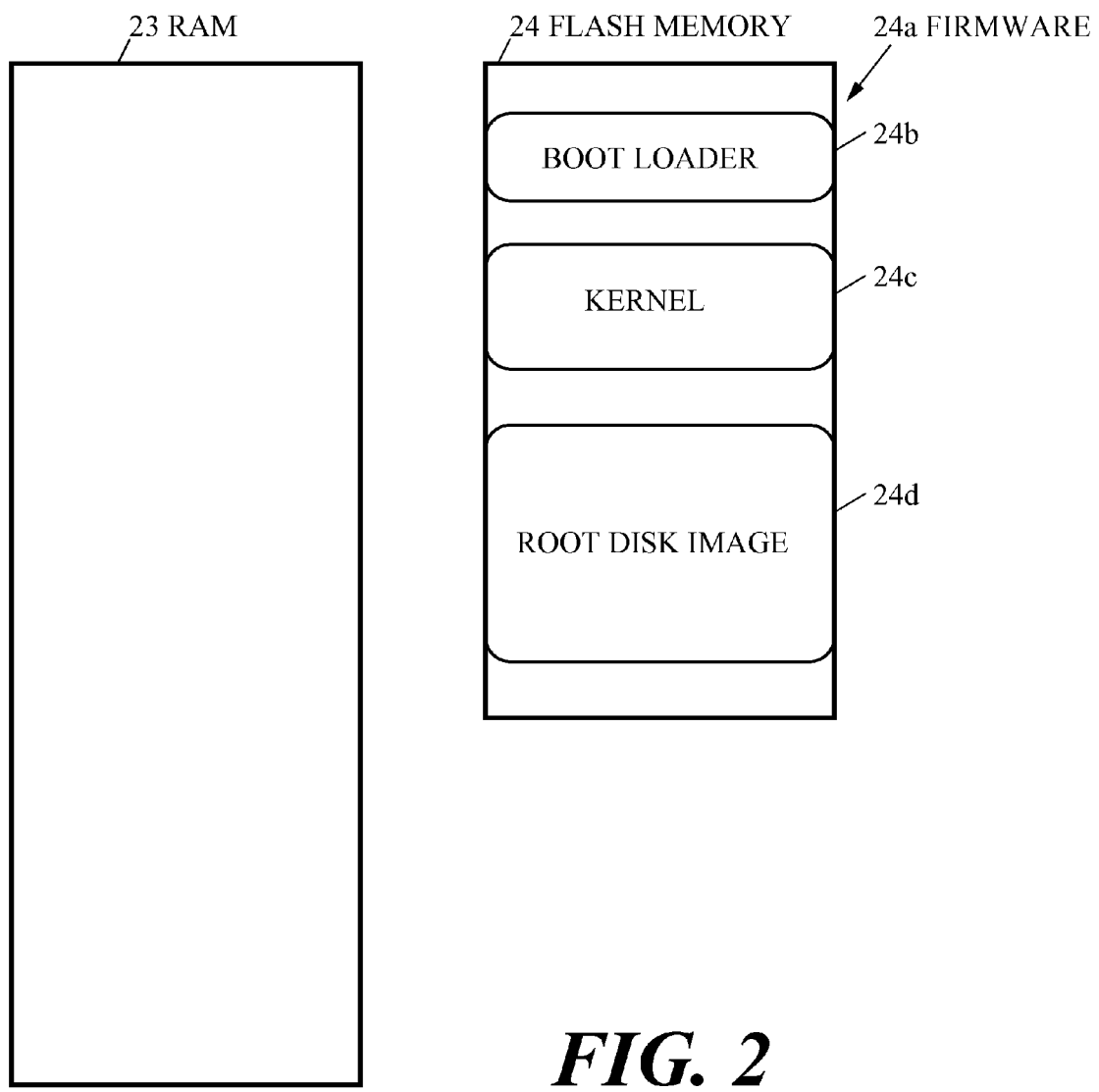
FIG. 2 is a schematic diagram illustrating a configuration of a RAM and a flash memory within the MFP illustrated in FIG. 1.

FIG. 2 is a schematic diagram illustrating a configuration of the RAM 23 and the flash memory 24 within the MFP 10.

As illustrated in FIG. 2, the flash memory 24 stores firmware 24a for a Linux® system.

The firmware 24a includes a boot loader 24b that is executed when the MFP 10 is booted, a kernel 24c to be expanded onto the RAM 23, a root disk image 24d serving as a compressed file of a root file system.

The root disk image 24d is a file having a format that can be read by the kernel 23c described later from the MTD via a read-only file system such as Cramfs or Squashfs.

Next, a description is made of an operation performed when the MFP 10 is booted.

Figure 3:
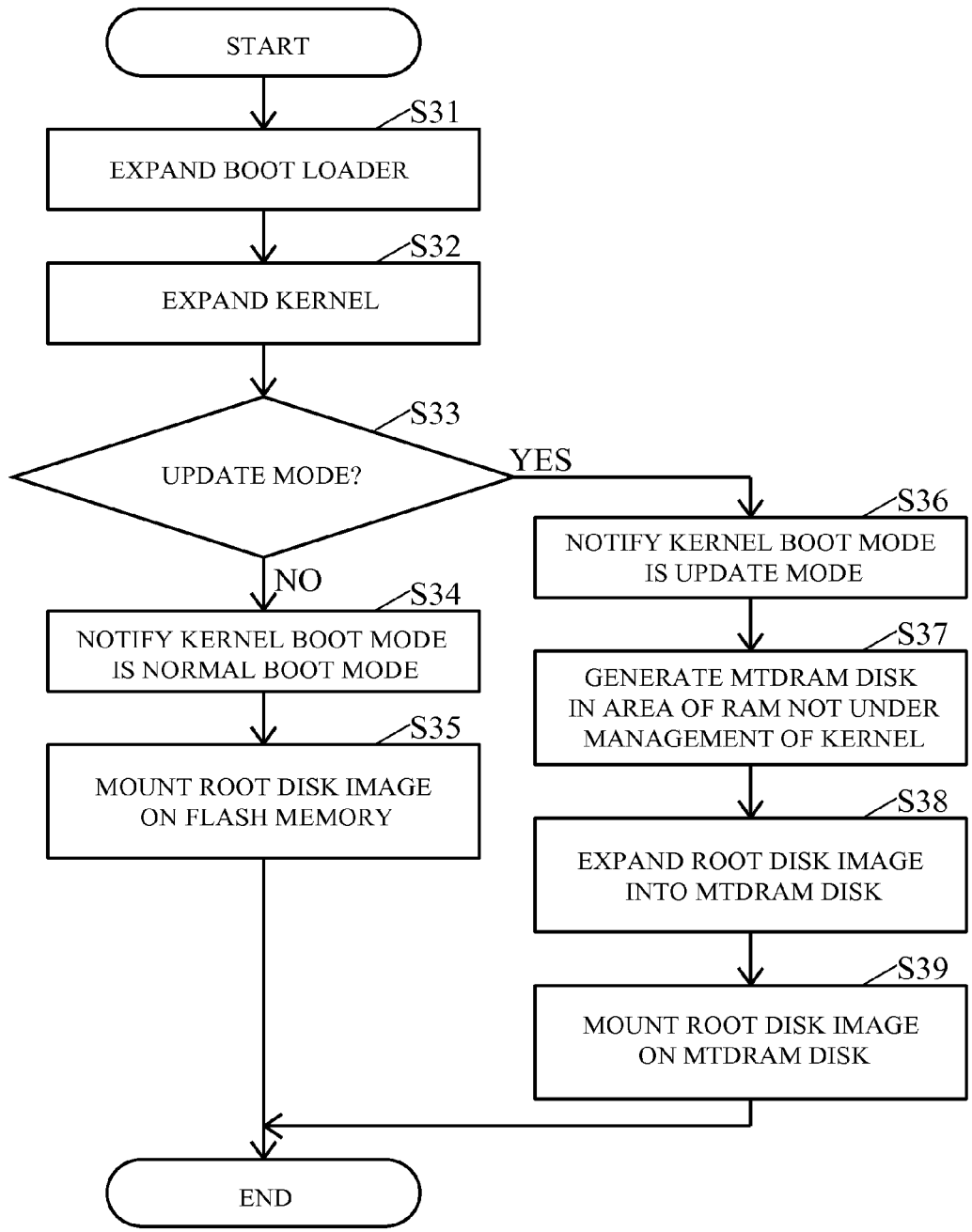
FIG. 3 is a flowchart of an operation performed when the MFP illustrated in FIG. 1 is booted.
Figure 4:
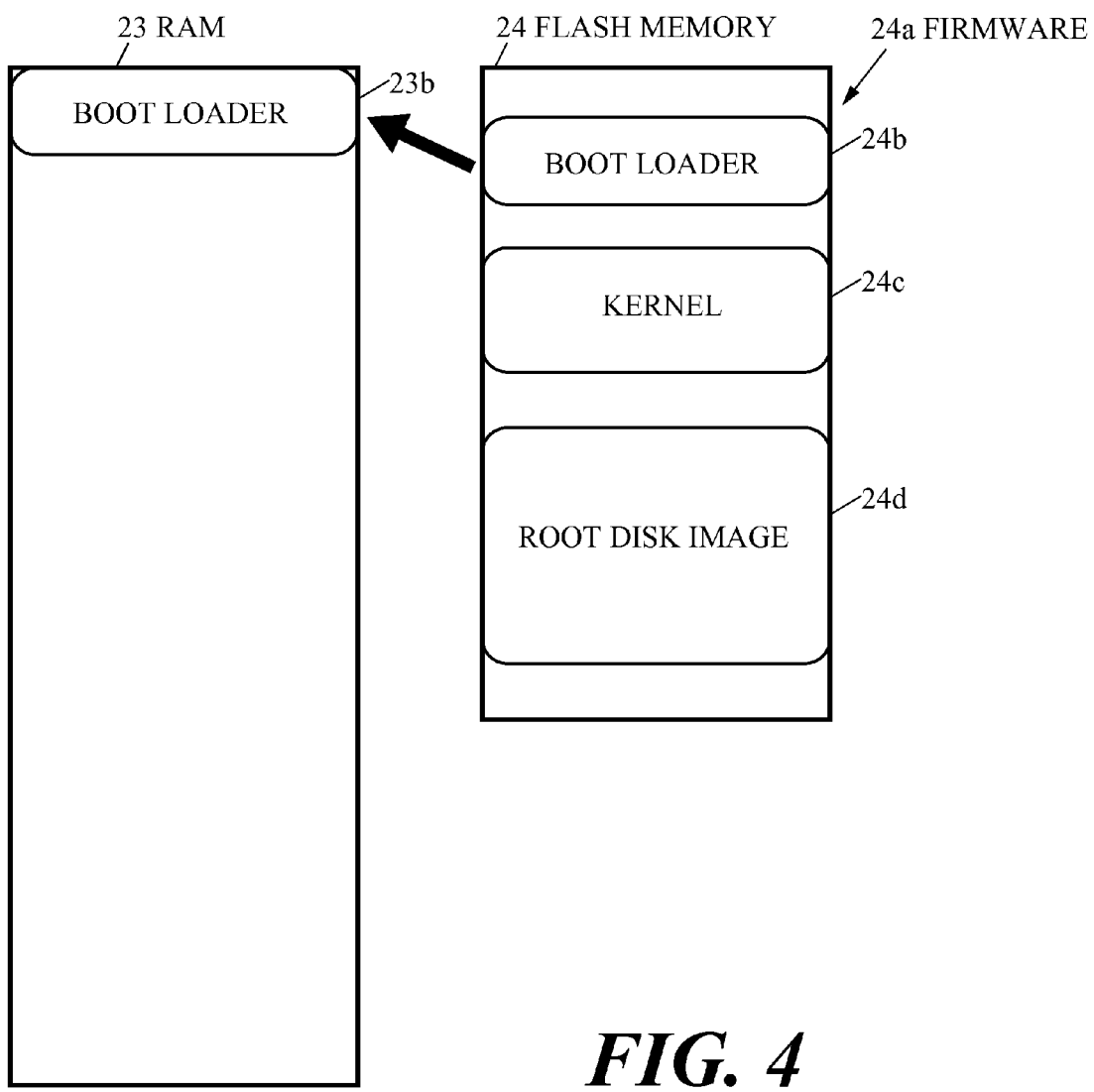
FIG. 4 is a schematic diagram illustrating a configuration of the RAM and the flash memory illustrated in FIG. 2 when a boot loader has been expanded onto the RAM.

FIG. 3 is a flowchart of an operation performed when the MFP 10 is booted. FIG. 4 is a schematic diagram illustrating a configuration of the RAM 23 and the flash memory 24 when a boot loader 23b has been expanded onto the RAM 23.

As illustrated in FIG. 3, when the MFP 10 is booted, the CPU 21 expands the boot loader 24b on the flash memory 24 onto the RAM 23 as the boot loader 23b as illustrated in FIG. 4 (S31).

Figure 5:
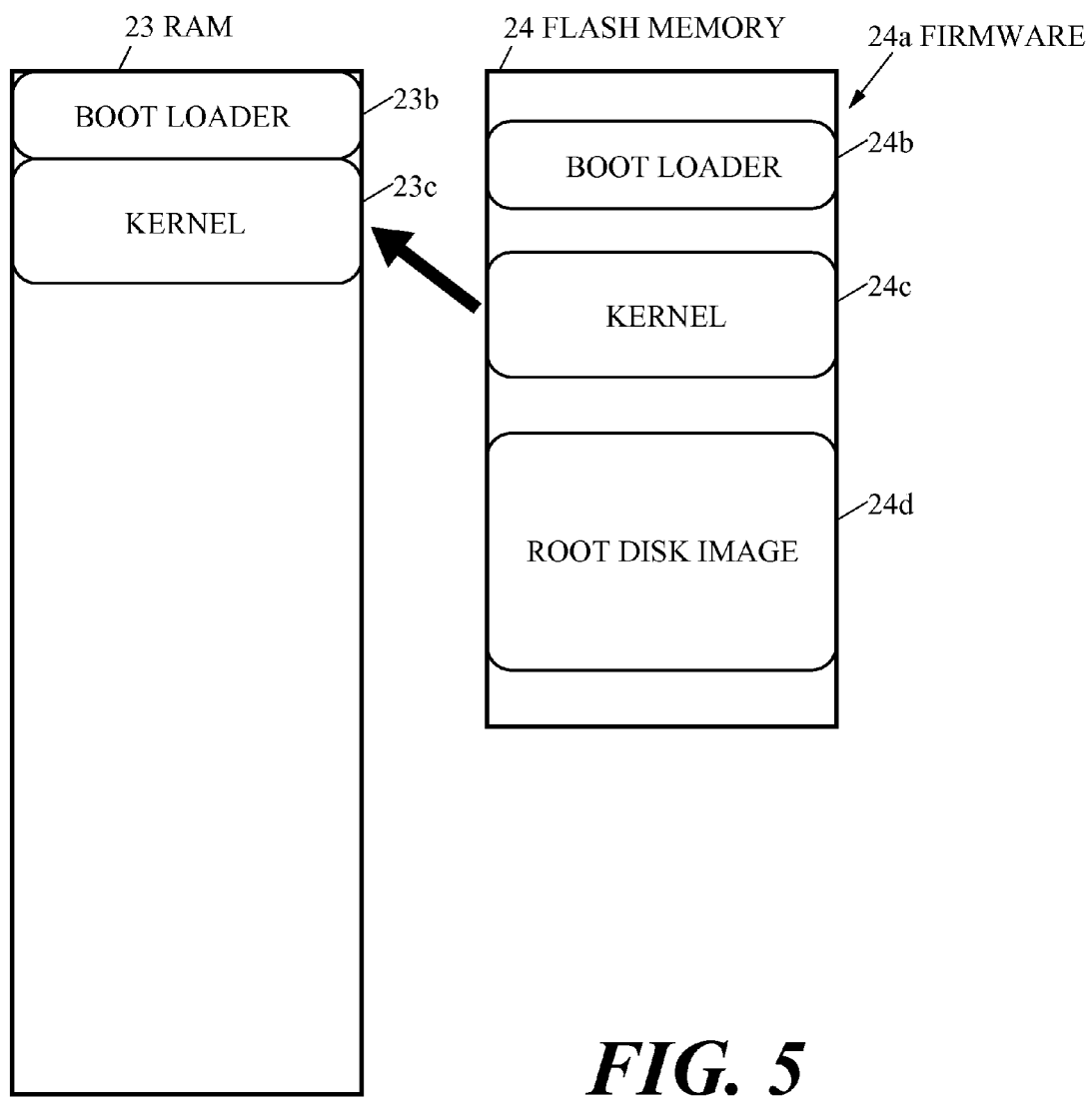
FIG. 5 is a schematic diagram illustrating a configuration of the RAM and the flash memory illustrated in FIG. 2 when a kernel has been expanded onto the RAM.

FIG. 5 is a schematic diagram illustrating a configuration of the RAM 23 and the flash memory 24 when the kernel 23c has been expanded onto the RAM 23.

When the process of Step S31 is finished, the boot loader 23b executed by the CPU 21 expands the kernel 24c on the flash memory 24 onto the RAM 23 as the kernel 23c as illustrated in FIG. 5 (S32).

Subsequently, the boot loader 23b determines whether or not a boot mode of the MFP 10 is an update mode for updating the firmware 24a on the flash memory 24 (S33).

When determining in Step S33 that the boot mode is not the update mode, in other words, that the boot mode is a normal boot mode, the boot loader 23b notifies the kernel 23c that the boot mode is the normal boot mode (S34).

Figure 6:
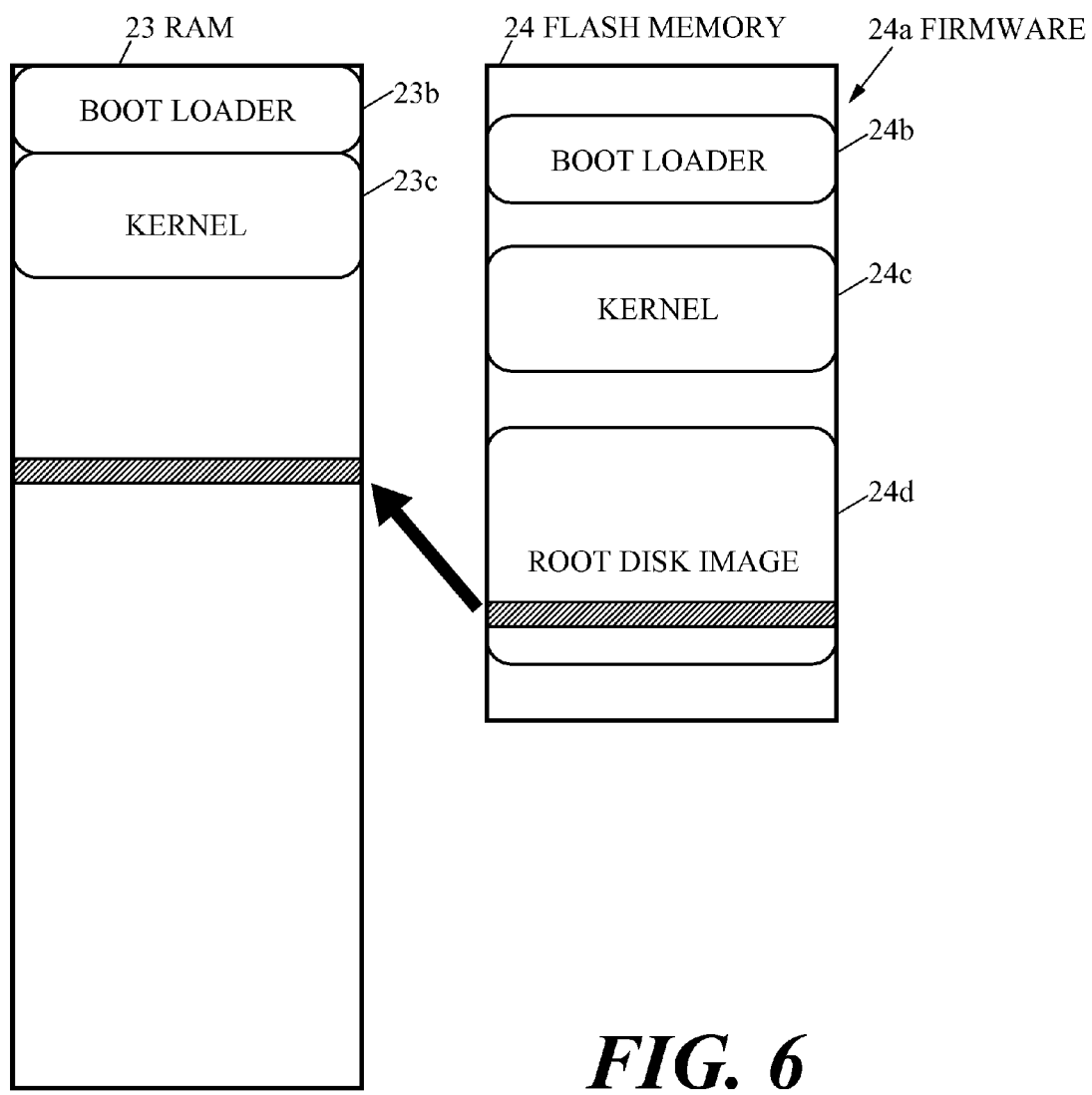
FIG. 6 is a schematic diagram illustrating a configuration of the RAM and the flash memory when a boot mode of the MFP is a normal boot mode.

FIG. 6 is a schematic diagram illustrating a configuration of the RAM 23 and the flash memory 24 when the boot mode of the MFP 10 is the normal boot mode.

When notified by the boot loader 23b that the boot mode is the normal boot mode, the kernel 23c executed by the CPU 21 mounts the root disk image 24d on the flash memory 24 as a root file system (S35). Accordingly, as illustrated in FIG. 6, the root disk image 24d is read into an area of the RAM 23 not under management of the kernel 23c in unit of the page as the need arises.

When determining in Step S33 that the boot mode is the update mode, the boot loader 23b notifies the kernel 23c that the boot mode is the update mode (S36).

Figure 7:
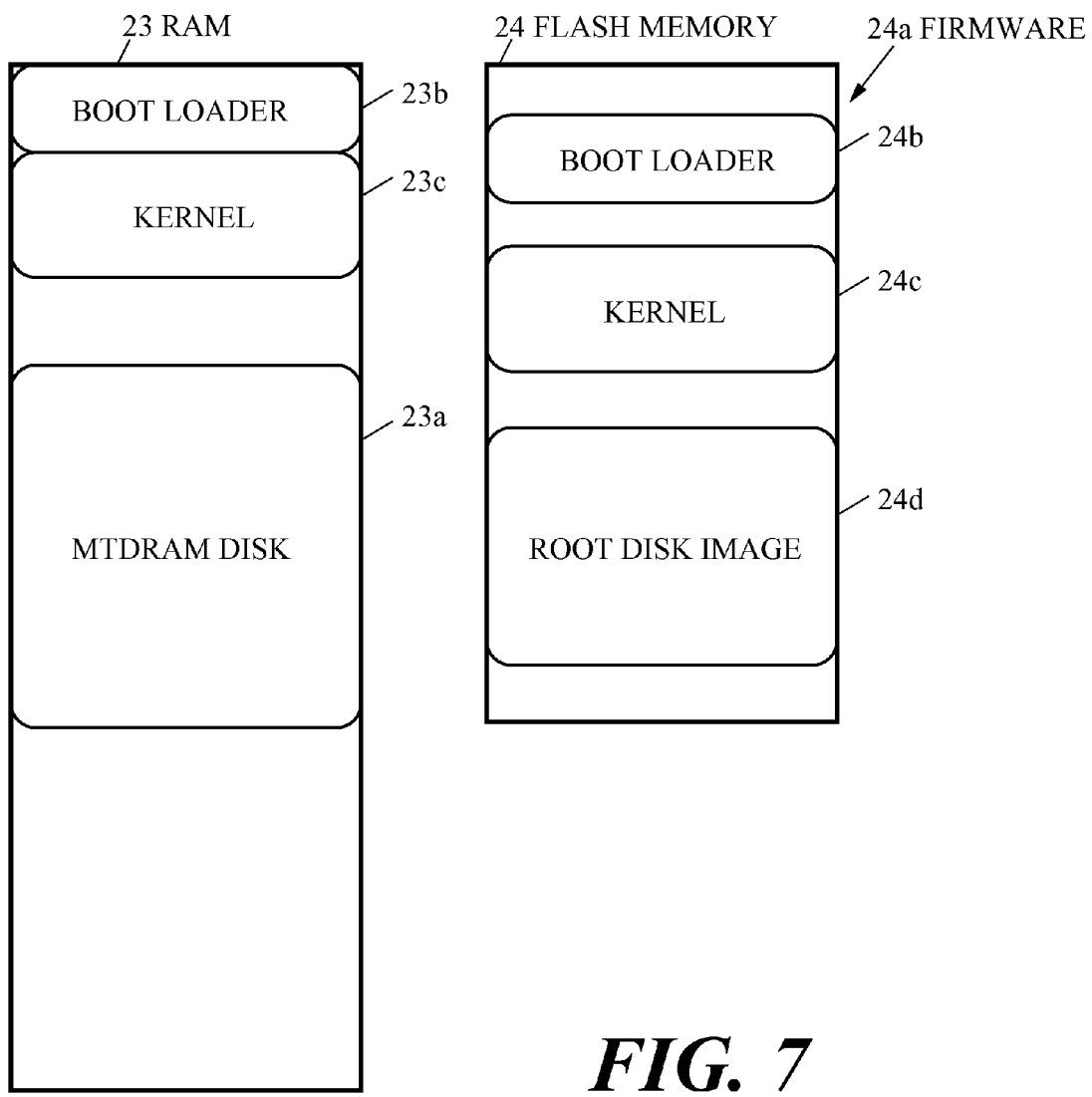
FIG. 7 is a schematic diagram illustrating a configuration of the RAM and the flash memory illustrated in FIG. 2 when an MTDRAM disk has been generated in an area of the RAM not under management of the kernel.

FIG. 7 is a schematic diagram illustrating a configuration of the RAM 23 and the flash memory 24 when an MTDRAM disk 23a has been generated in the area of the RAM 23 not under the management of the kernel 23c.

When notified by the boot loader 23b that the boot mode is the update mode, as illustrated in FIG. 7, the kernel 23c generates a RAM disk (hereinafter referred to as "MTDRAM disk") 23a serving as an MTD in the area of the RAM 23 not under the management of the kernel 23c (S37).

Figure 8:
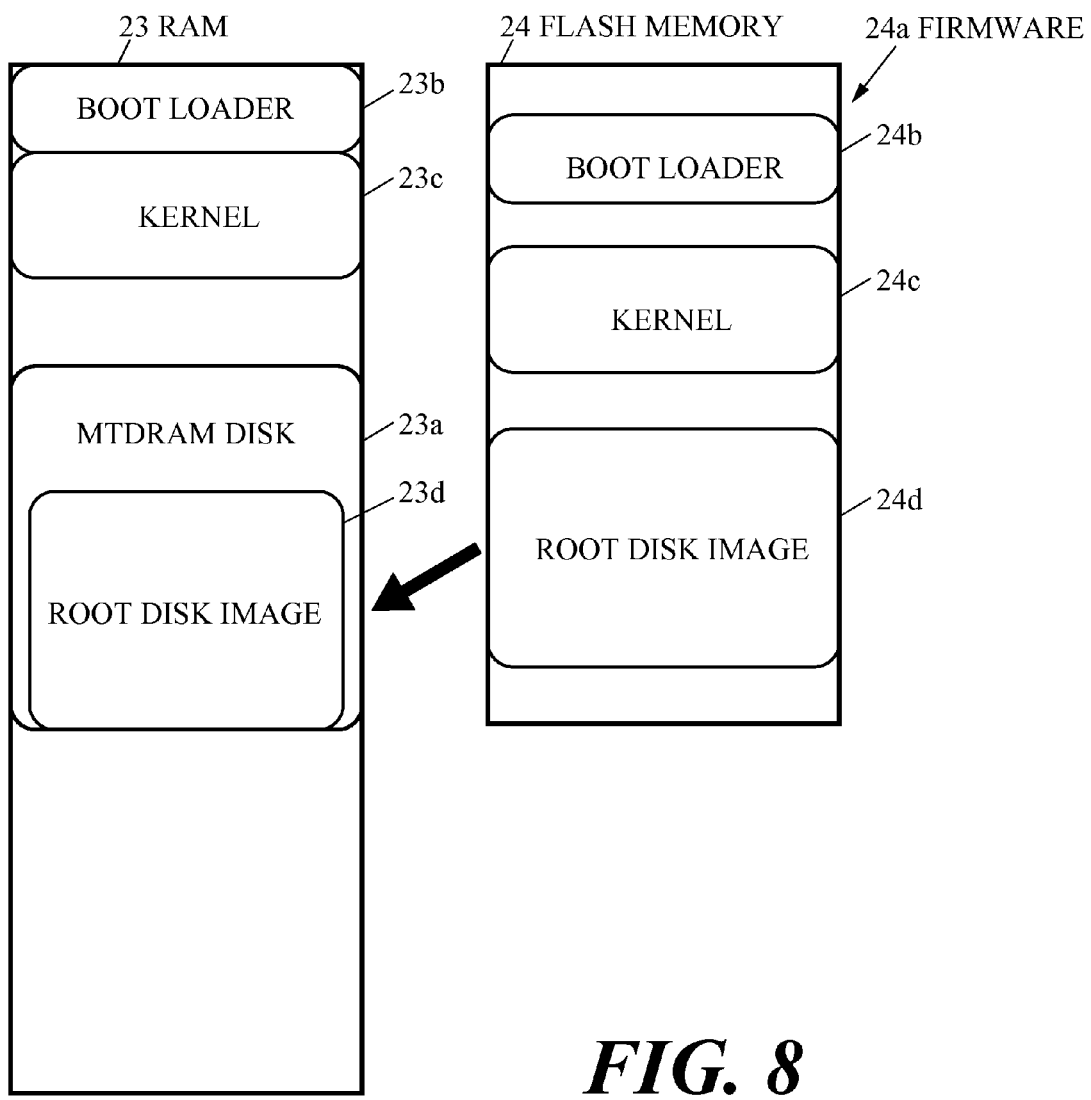
FIG. 8 is a schematic diagram illustrating a configuration of the RAM and the flash memory illustrated in FIG. 2 when a root disk image has been expanded into the MTDRAM disk.

FIG. 8 is a schematic diagram illustrating a configuration of the RAM 23 and the flash memory 24 when a root disk image 23d has been expanded into the MTDRAM disk 23a.

After the process of Step S37, the kernel 23c expands the root disk image 24d on the flash memory 24 into the MTDRAM disk 23a as the root disk image 23d as illustrated in FIG. 8 (S38).

Figure 9:
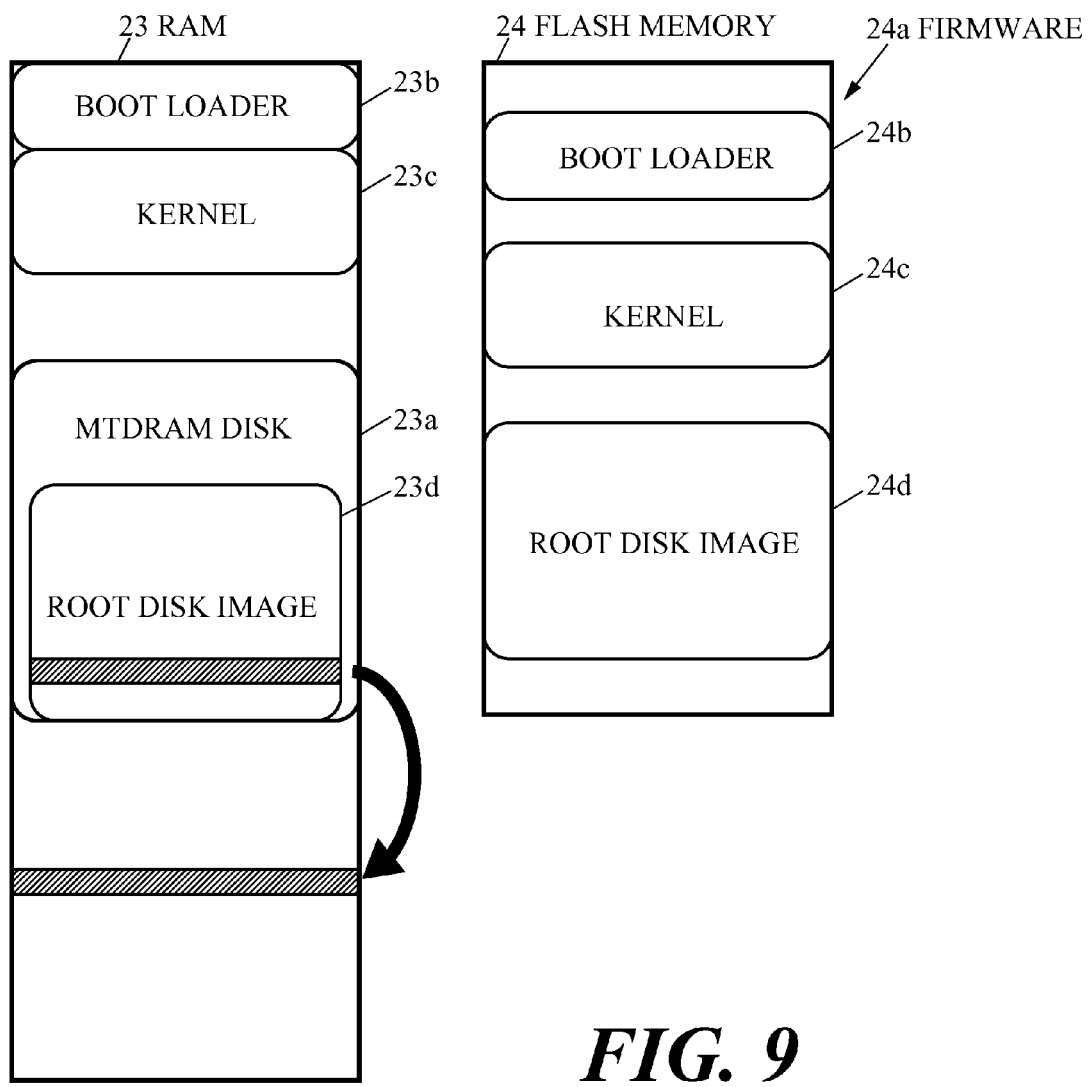
FIG. 9 is a schematic diagram illustrating a configuration of the RAM and the flash memory illustrated in FIG. 2 when the boot mode of the MFP is an update mode.
Figure 10:
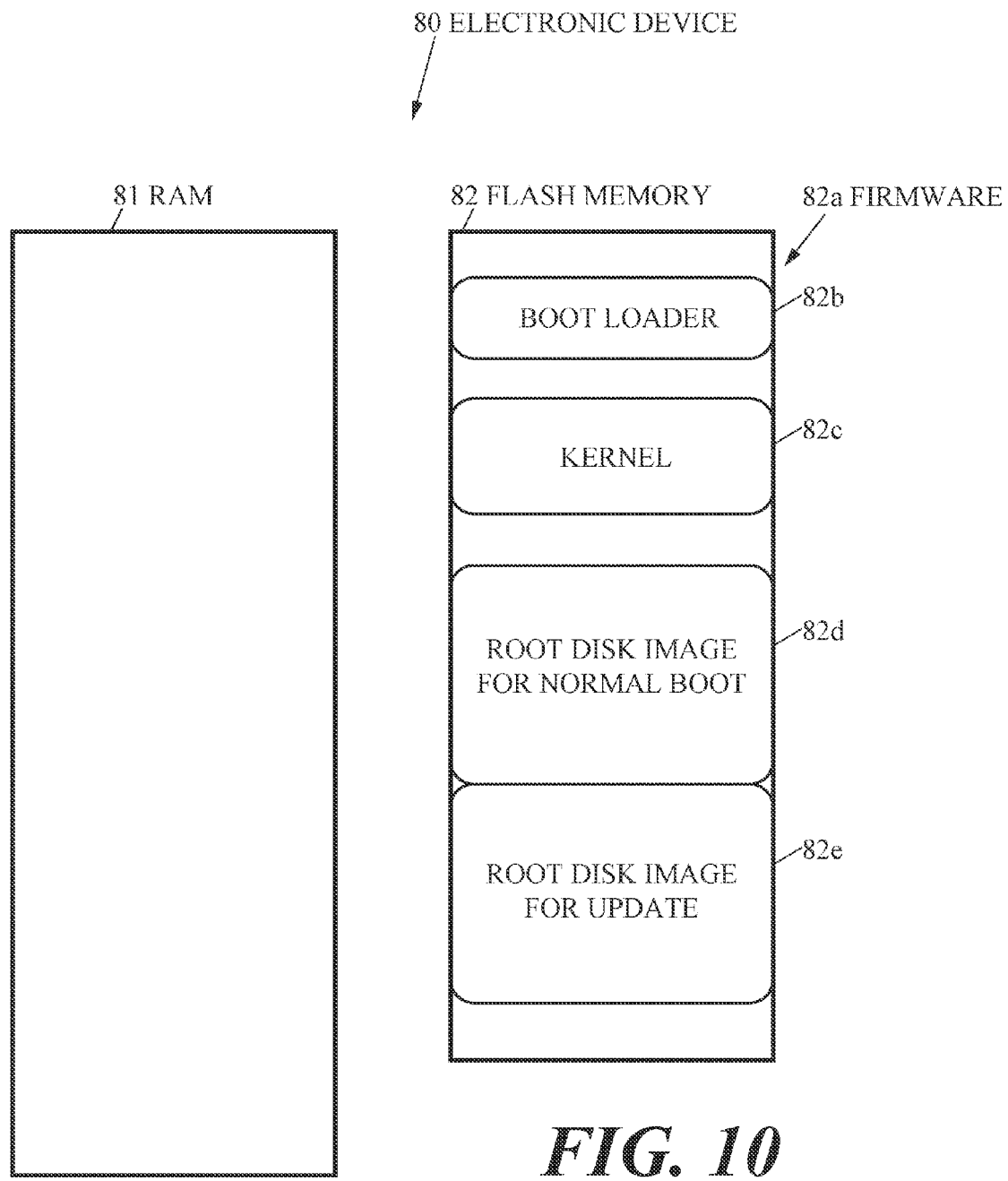
FIG. 10 is a schematic diagram illustrating an example of a configuration of a RAM and a flash memory within a typical electronic device.
Figure 11:
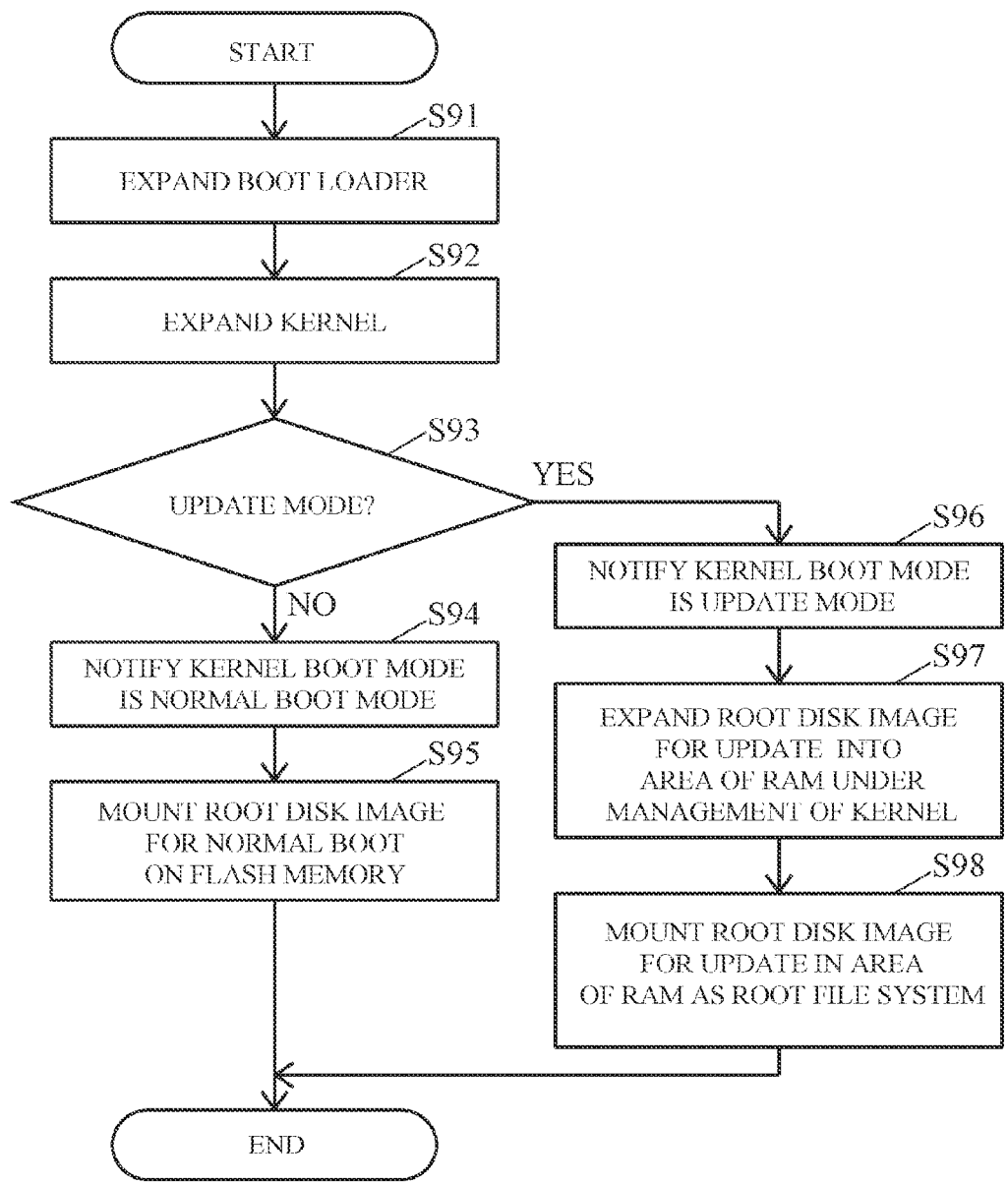
FIG. 11 is a flowchart of an operation performed when the typical electronic device illustrated in FIG. 10 is booted.
Figure 12:
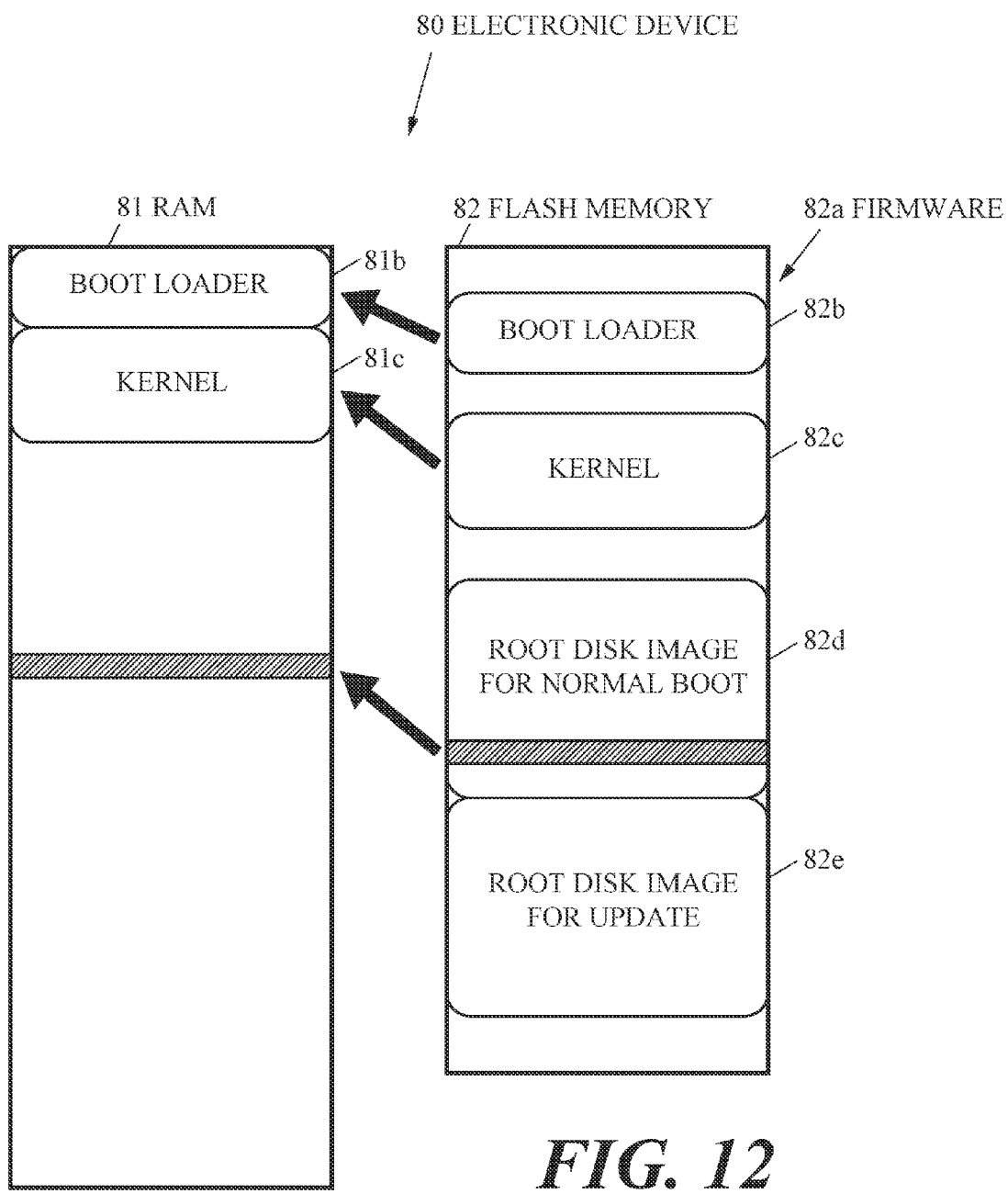
FIG. 12 is a schematic diagram illustrating a configuration of the RAM and the flash memory illustrated in FIG. 10 employed when a boot mode of the typical electronic device is a normal boot mode.
Figure 13:
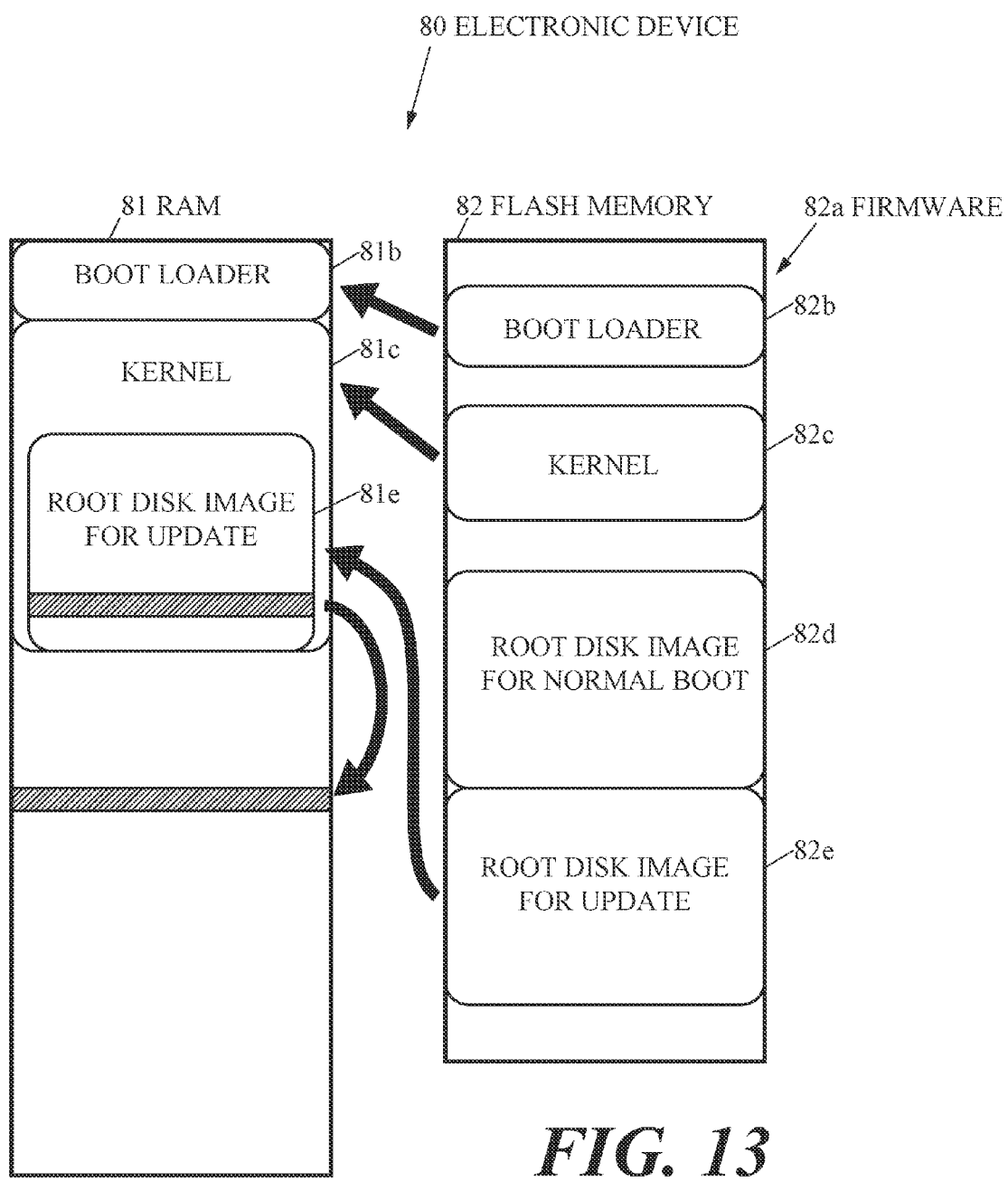
FIG. 13 is a schematic diagram illustrating a configuration of the RAM and the flash memory illustrated in FIG. 10 employed when the boot mode of the typical electronic device is an update mode.

FIG. 9 is a schematic diagram illustrating a configuration of the RAM 23 and the flash memory 24 when the boot mode of the MFP 10 is the update mode.

After the process of Step S38, the kernel 23c mounts the root disk image 23d on the MTDRAM disk 23a as the root file system (S39). Accordingly, as illustrated in FIG. 9, the root disk image 23d is read into the area of the RAM 23 not under the management of the kernel 23c in unit of the page as the need arises. Note that, the CPU 21 operates in accordance with the root disk image 23d on the MTDRAM disk 23a, and hence can delete the firmware 24a before update from the flash memory 24 and then write the firmware 24a after update into the flash memory 24.

When the process of Step S35 or Step S39 is finished, the CPU 21 finishes the operation illustrated in FIG. 3.

As described above, the MFP 10 stores, in the flash memory 24, the root disk image 24d used in common when the boot mode is the normal boot mode and when the boot mode is the update mode, and can therefore suppress a capacity necessary for the flash memory 24 to a lower level than in a configuration in which a root disk image used when the boot mode is the normal boot mode and a root disk image used when the boot mode is the update mode are separately stored in the flash memory 24.

Further, on the MFP 10, when the boot mode is the normal boot mode, the root disk image 23d is not expanded into the area of the RAM 23 not under the management of the kernel 23c, which can increase the capacity of the usable area of the RAM 23.

Note that, the nonvolatile storage device according to the present disclosure is a flash memory in this embodiment, but may be any storage device other than the flash memory as long as the nonvolatile storage device is the MTD.

Further, the electronic device according to the present disclosure is an MFP in this embodiment, but may be any image forming apparatus other than the MFP, such as a copying machine or a printer, or may be any electronic device other than the image forming apparatus such as a general-purpose personal computer.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An electronic device, comprising:
   a central processing unit (CPU);
   a random access memory (RAM) that is used as a work area for the CPU; and
   a flash memory as a nonvolatile storage device that acts as a memory technology device (MTD), wherein the flash memory has stored thereon firmware for an open-source code operating system, and the firmware comprises:
   a boot loader that is expanded onto the RAM from the flash memory by the CPU, when the electronic device is booted, and determines whether a boot mode of the electronic device is an update mode for updating the firmware in the flash memory, or a normal mode;
   a kernel that is expanded onto the RAM from the flash memory by the boot loader; and
   only one root disk image, as a compressed file of a root file system, that includes a file that has a format read by the kernel from the MTD via a read-only file system,
   wherein the only one root disk image on the flash memory is used both when the boot mode is the normal boot mode and when the boot mode is the update mode,
   wherein the kernel, when notified by the boot loader that the boot mode of the electronic device is the normal boot mode, mounts the root disk image on the flash memory as the root file system, and the mounted root disk image is read into an area of the RAM not under management of the kernel in unit of a page, and
   wherein the kernel, when notified by the boot loader that the boot mode is the update mode, i) generates a RAM disk as the MTD in the area of the RAM not under management of the kernel, ii) expands the root disk image on the flash memory into the RAM disk, iii) mounts the root disk image on the RAM disk as the root file system, iv) the root disk image is read into the area of the RAM not under the management of the kernel in unit of the page, and v) the CPU, in accordance with the root disk image on the RAM disk, deletes the firmware before update from the flash memory, and then writes the firmware after update into the flash memory.

2. The electronic device according to claim 1, wherein the file included in the root disk image has the format that can be read by the kernel from the MTD via the read-only file system such as Cramfs or Squashfs.

3. A method by an electronic device that includes i) a central processing unit (CPU); ii) a random access memory (RAM) that is used as a work area for the CPU; and iii) a flash memory as a nonvolatile storage device that acts as a memory technology device (MTD), the method comprising:
providing a firmware for an open-source code operating system on the flash memory, wherein the firmware comprises a boot loader, a kernel, and only one root disk image as a compressed file of a root file system, including a file that has a format read by the kernel from the MTD via a read-only file system;
expanding, via the CPU, the boot loader from the flash memory onto the RAM, when the electronic device is booted;
expanding, via the boot loader, the kernel from the flash memory onto the RAM;
determining, via the boot loader, whether a boot mode of the electronic device is an update mode for updating the firmware on the flash memory, or a normal mode;
mounting, via the kernel, the root disk image on the flash memory as the root file system, when notified by the boot loader that the boot mode of the electronic device is the normal boot mode, wherein the mounted root disk image is read into an area of the RAM not under management of the kernel in unit of a page;
generating, via the kernel, a RAM disk as the MTD in the area of the RAM not under management of the kernel, when notified by the boot loader that the boot mode is the update mode;
expanding, via the kernel, the root disk image on the flash memory into the RAM disk;
mounting, via the kernel, the root disk image on the a RAM disk as the root file system, wherein the root disk image is read into the area of the RAM not under the management of the kernel in unit of the page; and
deleting, via the CPU in accordance with the root disk image on the RAM disk, deleting the firmware before update from the flash memory, and then writing the firmware after update into the flash memory,
wherein the only one root disk image on the flash memory is used in common when the boot mode is the normal boot mode and when the boot mode is the update mode.

4. A non-transitory computer-readable medium having a program, the program causing a central processing unit (CPU), in an electronic device that includes a random access memory (RAM) that is used as a work area for the CPU; and a flash memory as a nonvolatile storage device that acts as a memory technology device (MTD), to perform the following operations:
providing a firmware for an open-source code operating system on the flash memory, wherein the firmware comprises a boot loader, a kernel, and only one root disk image as a compressed file of a root file system, including a file that has a format read by the kernel from the MTD via a read-only file system;
expanding, via the CPU, the boot loader from the flash memory onto the RAM, when the electronic device is booted;
expanding, via the boot loader, the kernel from the flash memory onto the RAM;
determining, via the boot loader, whether a boot mode of the electronic device is an update mode for updating the firmware on the flash memory, or a normal mode;
mounting, via the kernel, the root disk image on the flash memory as the root file system, when notified by the boot loader that the boot mode of the electronic device is the normal boot mode, wherein the mounted root disk image is read into an area of the RAM not under management of the kernel in unit of a page;
generating, via the kernel, a RAM disk as the MTD in the area of the RAM not under management of the kernel, when notified by the boot loader that the boot mode is the update mode;
expanding, via the kernel, the root disk image on the flash memory into the RAM disk;
mounting, via the kernel, the root disk image on the a RAM disk as the root file system, wherein the root disk image is read into the area of the RAM not under the management of the kernel in unit of the page; and
deleting, via the CPU in accordance with the root disk image on the RAM disk, the firmware before update from the flash memory, and then writing the firmware after update into the flash memory,
wherein the only one root disk image on the flash memory is used in common when the boot mode is the normal boot mode and when the boot mode is the update mode.

* * * * *